Aug. 9, 1949. J. F. O'BRIEN 2,478,204
FEED SECTION UNIT FOR ELECTRICAL WIRING SYSTEMS
Filed Feb. 7, 1945 3 Sheets-Sheet 1
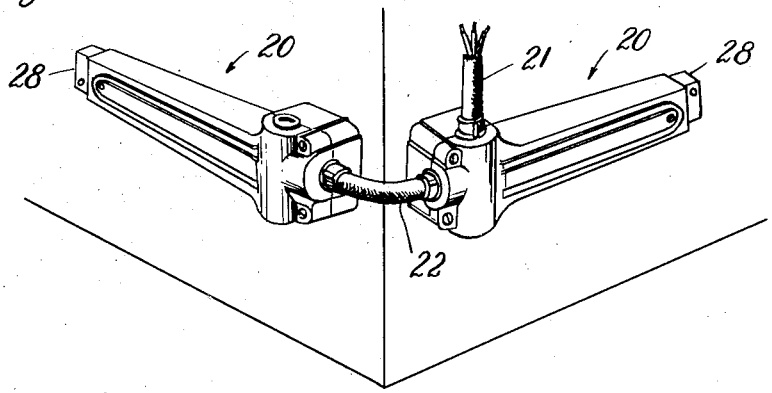
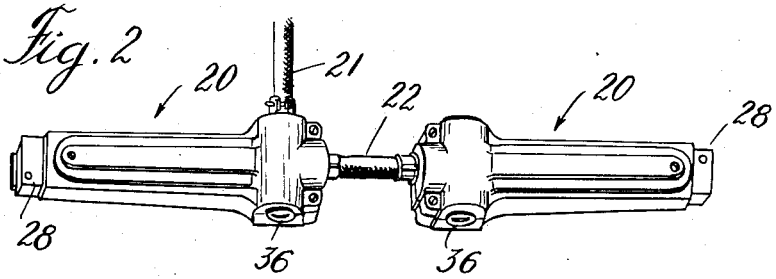
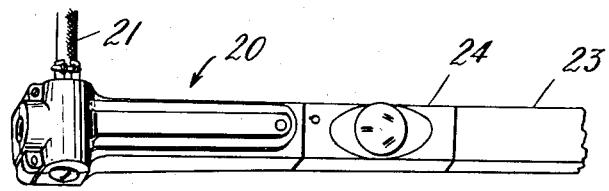
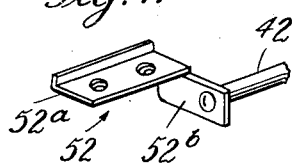
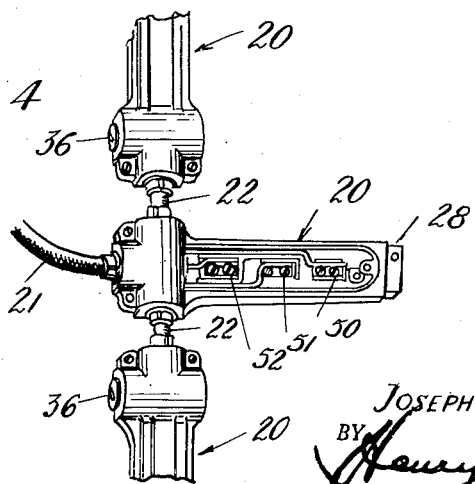
INVENTOR.
JOSEPH F. O'BRIEN
BY
Henry J. Lucke
ATTORNEY

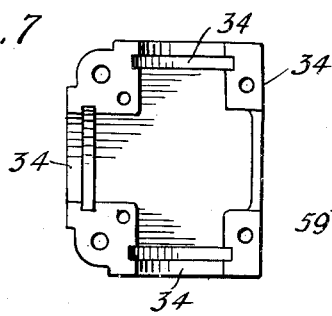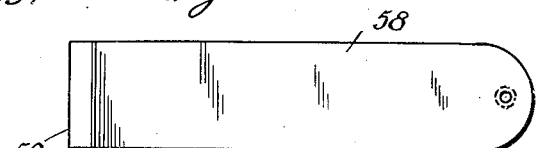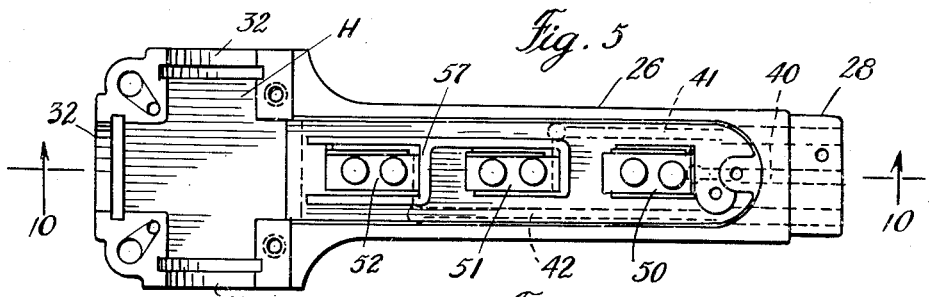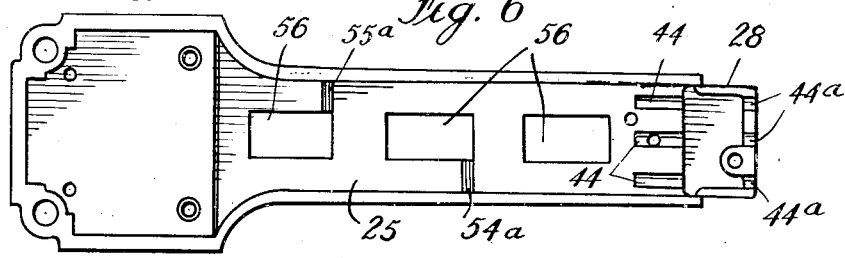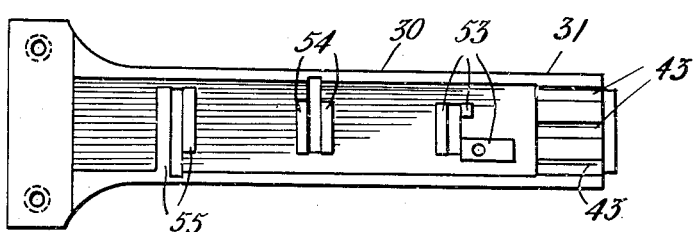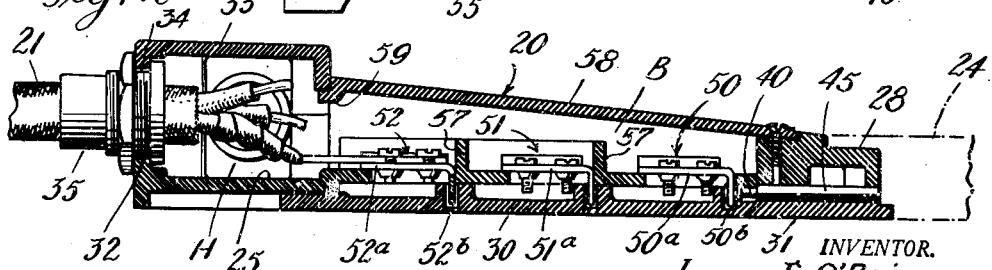
INVENTOR.
JOSEPH F. O'BRIEN

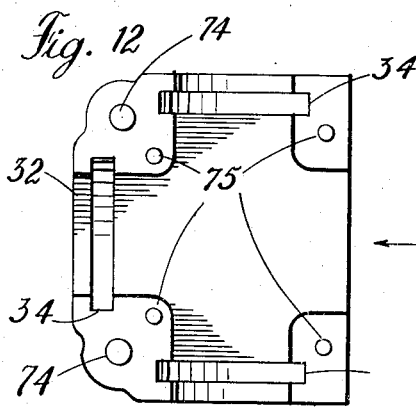
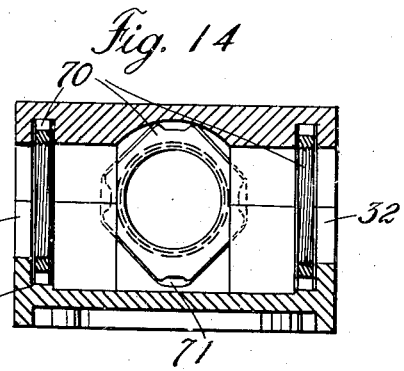
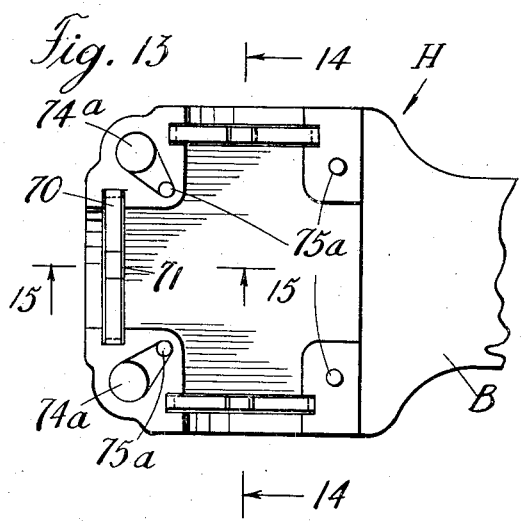
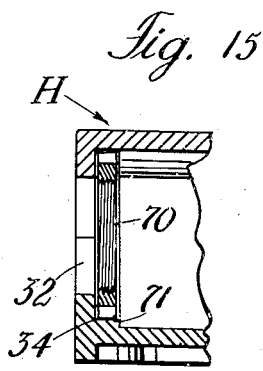
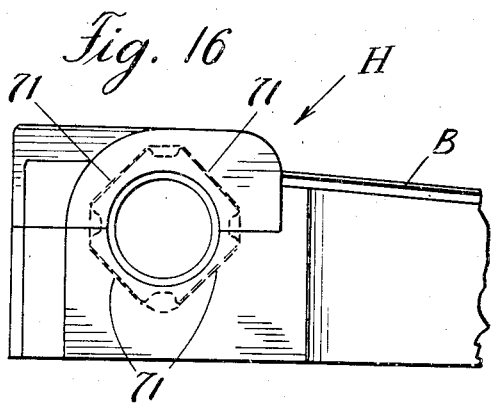
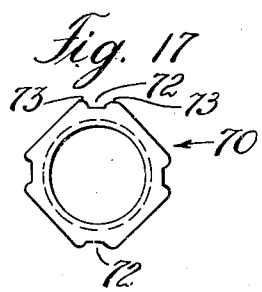

Patented Aug. 9, 1949

2,478,204

UNITED STATES PATENT OFFICE 2,478,204

FEED SECTION UNIT FOR ELECTRICAL WIRING SYSTEMS

Joseph F. O'Brien, Lebanon, N. J., assignor to John B. Pierce Foundation, New York, N. Y., a corporation of New York Application February 7, 1945, Serial No. 576,525

1 Claim. (Cl. 173—334.1)

This invention relates to electric wiring devices, and particularly, to feed sections into which power feed lines may be brought.

This application is a continuation-in-part of my pending application bearing Serial No. 442,594, dated May 12th, 1942, and bearing title "Feed section unit for electric wiring system," now U. S. Patent No. 2,385,375, issued Sept. 25, 1945.

In my U. S. Letters Patent No. 2,351,631, dated June 20th, 1944, there is disclosed a wiring system comprising a plurality of conductor-containing units arranged for seriatim electrical and mechanical interconnection to provide a continuous electric wiring system of whatever length is desired. Such units may be positioned on a wall surface and suitably secured thereto. The present invention relates to improved means for connecting such a wiring system to a source of electric power.

Among the objectives of my invention are: to provide an improved feed section or power head unit for an electric wiring system; to provide a feed section which permits the introduction of power source conductors thereinto at a plurality of optional locations; to provide a feed section which may be used as a common feed junction for a plurality of wiring systems; to provide a feed section which may serve as the end section of a wiring system of interconnected unit sections; to provide a feed section which may be used, optionally, with two-conductor or three-conductor wiring systems; and to provide a feed section which may serve as an end section of a wiring system for interconnection with a similar feed section of a second wiring system, whereby a plurality of individual wiring systems may be mutually interconnected and served from a common source of electric power; to provide a power head unit adapted to be secured to and be flush with and in the plane of the wall and to be there interconnected with other units of the serially connected wiring system, as shown in the accompanying drawings.

In a preferred embodiment, the invention includes an elongate body structure having at one end a configuration and cross sectional dimension similar to the adjacent conductor units, and adapted to mechanically interconnect therewith without visible break or offset.

At the other end, preferably, of such elongate body is a hollow junction head having a volumetric capacity suitable to receive several power cables or mutually interconnected electricity conductors. Preferably, said head has an approximately cruciform configuration, to present at least three "branches" through which said cables or electricity conductors may be introduced into the hollow head. Such "branches" may have access openings closed by suitable removable plugs when not in use. Disposed within the body, and preferably beneath an insulating table which forms the base of a connection wall, are electricity conductors, matching in number, the electricity conductors of the adjacent conductor unit of the wiring system. To each of the conductors in the said body, there is secured a suitable binding post member, preferably having clamping screws or equivalent disposed within the connection well. The connection well is accessible from the top of the body, and may be closed by a removable cover plate. It will be recognized that the said elongated body, binding post member and conductors constitute a connecting block in communication with the aforesaid hollow junction head.

Electricity conductors or cables from a power source may be introduced into the head from any of the optional points of entry, and passed from the head to the body well portion, for interconnection with the aforesaid binding posts therein. If the feed section is to serve as a central feed section for other, physically independent wiring systems, electricity conductor jumper cables may be interconnected with the power source conductors within the junction head of the feed section, and carried through the wall thereof and into the junction head of a feed section of such other wiring system, for interconnection with the electricity conductors of the other system.

The conductors of the body portion of the feed section are preferably rigid rods or tubes, arranged to precise registry with the conductors of the adjacent unit of the wiring system. When rods are used, elongated sleeve terminals are provided at the end thereof, whereby electrical connection between the feed section conductors and those of the adjacent unit may advantageously be made by inserting the rod conductors of the adjacent unit into the appropriate sleeves of the feed section conductors.

Most preferably, such hollow junction head is of two-part molded thermosetting plastic having openings for the entry of the couplings for the electrical cables, such openings desirably being formed of complementary partial openings in the respective two parts of the head, the walls of such partial openings being slotted to freely receive nuts for coupling with the threaded ends of the cable couplings, so arranged that when the cable couplings are located in the selected head openings, the nuts being attached to the threaded ends of the cable couplings and the parts of the head assembled and mutually secured, the cable couplings are held by the nuts securely within the selected openings of the plastic junction head, with suitable factor of safety against fracture.

Therefore: Another object of the present invention is to provide means at the openings of the junction of plastic for securement of the screw-threaded coupling members attached to the power cables.

Another object is to provide relatively simple means for accomplishing such securement and particularly one which does not require molded-in metal inserts.

In consequence, a further feature of the invention is the provision wherein such threaded coupling members may be secured by means not molded into the junction head but nevertheless securely positioned therein.

Further features and objects of the invention will be more fully understood from the following detail description and the accompanying drawings, in which Figs. 1 through 4 are illustrative of various ways in which my improved feed section unit may be employed in electric wiring systems;

Fig. 5 is a top plan view of the feed section, with the cover plates of the body and junction box removed;

Fig. 6 is a bottom plan view of the structure of Fig. 5;

Fig. 7 is a bottom plan view of the cover for the connection portion of the feed section;

Fig. 8 is a bottom plan view of the cover plate for the body section;

Fig. 9 is a top plan view of the sub-base of the body section;

Fig. 10 is a vertical section taken through a completely assembled feed section unit; and Fig. 11 is a perspective of a binding post member and therewith connected feed section conductor;

Fig. 12 is a top view of the lower junction head of the junction head or box, corresponding to view Fig. 7;

Fig. 13 is a top view similar to Fig. 12 with the nuts for engaging the power cable coupling member disposed in recesses and slots in the inner walls of said unit;

Fig. 14 is a sectional view on the line 14—14 of Fig. 13;

Fig. 15 is a sectional view on the line 15—15 of Fig. 13;

Fig. 16 is a fragmentary side elevation of the junction head including its lower housing portion and cap member showing the manner in which the cable coupling engaging nut is held in place, and Fig. 17 is an elevation of a suitable nut.

Referring to the drawings, Figs. 1 through 4 show typical installations of my improved feed section, wherein 20 represents said sections, 21 a power source cable, illustratively a three-wire cable, and 22 a connecting cable, as a jumper or the like for interconnecting adjacent feed sections.

Feed section 20 is particularly adaptable for use in electric wiring systems in which a plurality of conductor-containing units, such as are disclosed in my U. S. Patent No. 2,351,631, dated June 20th, 1944, and entitled Electricity conductor unit, are electrically and mechanically interconnected in seriatim to provide an electric wiring system of desired length. With said conductor units 23, Fig. 3, may be included any required number of electrically and mechanically interconnected outlet sections 24.

Said wiring unit sections and outlet provided units include rigid conductors such as rods or tubes of required current-carrying capacity; at one end are sleeves which frictionally receive the solid ends of the conductors of an adjacent unit, whereby a tight frictional fit extending over a substantial area is obtained. Said conductor units 23 or outlet units 24 may be devoid of facilities for direct interconnection with power source connectors, and it is a primary objective of the instant invention to provide a feed section which serves as a junction between the conductors of said seriatim interconnected units and the power source. It is a feature of the invention, also, that the feed sections provide means whereby one of them may serve not only as the junction of the power source conductors with conductor units of one system of interconnected units, but with other systems as well.

In Fig. 1, therefore, is shown a pair of feed sections 20 mounted at the corner junction of a vertical wall; the right-hand unit receives the power source cable 21 and serves as a distributive unit, whereby a jumper 22 may interconnect said feed sections with the common power source 21.

Fig. 2 is similar to Fig. 1, but showing the feed sections 20 as they would be installed on a wall or ceiling, each of said feed sections 20 being potentially the initial unit of an independent run of conductor units.

Fig. 3 shows a feed section 20 mechanically and electrically interconnected with a wiring system including an outlet 24 and a conductor unit 23, said wiring system being served by the power source conductors 21.

Fig. 4 shows an arrangement of three feed sections, in which the center section 20 is a distributor unit for other feed sections 20 extending at an angle thereto.

Fig. 4 also indicates the interconnection of the individual conductors of the power source cable 21 with the conductors of the feed section 20.

Referring to Fig. 10, the connector unit 20 includes a separate junction head H and a body portion B, said portions having a common base 25. Wall 26 of the body B, see Fig. 5, terminates in a male projection 28 for insertion into a complementary socket construction of outlet 24; the body structure is completed by a detachable plate sub-base 30, an end 31 of which serves to complete the said male projection 28, see Fig. 10.

In three of the side walls of the junction head are semi-cylindrical cut-out openings 32.

The junction head is completed by a cap or top member 33 having semi-cylindrical cut-out areas 34, corresponding to the cut-out areas 32; when the cap is in position, it cooperates to provide a junction box of relatively large volume, access to which is obtained through circular openings in three sides thereof for the reception and securement of connector means 35 for the power source conductors 21 or jumpers 22. When less than all of the openings through the junction head wall are in use, the remainder may be closed by any suitable means, such as the plugs 36, Fig. 4.

The interior volume of junction head H is suitable to accommodate a power source conductor or cable 21 and a jumper 22 introduced through respective side wall passages and mutually electrically interconnected.

In its illustrated form, feed section 20 is suitable for a standard three-wire circuit, and pursuant thereto, electricity conductors 40, 41, 42, are provided, to each of which is connected binding post means 50, 51, and 52. Said conductors and binding post means are removably positioned on sub-base plate 30; the terminals of said conductors may rest in grooves 43, with which grooves 44, 44a in the under side of base 25 cooperate to form passages within which the terminal end of each conductor is closely confined. The connection terminal of each conductor 40, 41, 42 may be a sleeve 45, for the reception of the end of a corresponding conductor of the unit 24, whereby electrical connection between the feed section and the unit 24 may be obtained.

To insure adequate electrical interconnection between the respective conductors of the feed section 20 and the outlet section 24, the sleeves 45 are sized to engage the conductors of section 24 tightly, and the forcible insertion of such conductors into the sleeves 45 during connection, or the forcible removal during disconnection, imposes substantial longitudinal strains upon the conductors 40, 41, 42. To prevent lateral displacement of said conductors, during the operation of connecting or disconnecting adjacent units, the binding posts 50, 51, 52, are angular, comprising a horizontal leg 50a, 51a, 52a respectively, and a vertical leg 50b, 51b, 52b. To said vertical legs are connected the respective conductors of the feed section; and said vertical legs are positioned between spaced abutments 53, 54, 55, which hold them against displacement. The under side of base 25 may have complementary grooves 54a, 55a, if desired.

As is illustrated in Fig. 5, the binding posts 50, 51, 52 are arranged in a single file, and to position the conductors thereof in parallel spaced relationship, the vertical legs of binding posts 50, 51, 52 extend to the right or left, as necessary.

The base 25 is provided with openings 56, each being of a size to permit the respective binding posts 50, 51, 52, to be snaked therethrough, with the forward edges of said binding posts resting upon said base 25, as shown in Fig. 10. A wall 57 is so arranged that each of the binding posts may be electrically isolated from the other to preclude possibility of short circuiting when the power source conductors are connected thereto.

Most preferably, the hollow junction head is of multi-part formation, conveniently of two parts of complemental interconnection. Desirably, as above indicated, the hollow junction head is molded of thermosetting plastic, such as "Bakelite," and accordingly possessing a definite coefficient of frangibility determined by the particular plastic material of which it is formed. To insure secured lodgment of the electrical cable in the selected opening of the junction head, the openings of the junction head are formed of multi-partial openings, the walls of which are each slotted as indicated at 34 in Figs. 5, 7 and 10, to receive a nut, the configuration of which is such that when the nut has been threadedly connected to the threaded end of the cable coupling, and the complementary parts of the junction head assembled and mutually secured, the cable is securely lodged by the nut within such head opening and in a manner within a factor of safety against frangibility of the material of the junction head.

As one manner of such assembly, the nut, such as the nut 70 shown in Figs. 13 through 17, may be of polygonal configuration, such as of quadragonal or diamond shape. Co-operatively therewith, the inner faces of the walls designated 71 of the respective slots 34 are correspondingly configured, viz., of quadragonal or diamond shape, whereby the nut 70 when dropped into the slot of lower part of the junction head and the upper part of the junction head placed in position, the nut is securely lodged within the slot.

Such nut 70 may be cut-away at its corners, indicated at 72, to provide thereat wings, indicated 73, for facilitating threading the nut, manually or with a spanner wrench, with respect to the threaded end of the cable coupling, namely at the stage prior to positioning the nut within the slot 34.

It is further observed that a limited degree of play ensues between the nut 70 and the polygonally configurated walls of the slot 34, thus affording limited displacement of the cable coupling laterally relative to the junction head as an entirety without giving rise to any strain upon the material of walls of the head opening 32, a feature of advantage at the stage of securement of the junction head or assembly of junction heads to the respective faces of the walls of a corner as indicated in Fig. 1, or in variantly extending group positions as illustrated in Figs. 2 and 4.

To afford precision of assembly of the two-part construction of the junction head H, sets of pins 74, 75, and mating locking recesses 74a, 75a, are provided in the respective two parts, as illustrated in Figs. 12 and 13 as well as in preceding figures of the drawings.

As stated hereinabove, such openings 32 of correlated junction head unit are available for the interconnection of two or more junction head units by means of jumpers, the conductors of which are respectively connected with the appropriate electrical conductors of the respective seriatim-connected electrical conductor systems, such jumper or jumpers being provided at their terminations with threaded or other connectible coupling means, adapted to be mechanically secured to the nuts of the selected head openings, and similarly securely lodged in relation to such interconnected junction head unit.

Such provision of nuts or equivalent affords securement of plugs, such as the plugs 36, see Figs. 2 and 4, for closing the openings not employed for the entry of power cable or jumpers, to thereby safeguard against access to the leads of the cables or jumper and to the electrical conductors within the junction head unit, also for the prevention of entry of dust and other foreign substances, and other protective purposes.

Whereas, I have described and illustrated variant embodiments of the invention, it will be understood that variations may be made without departing from the principle of the invention as defined by the appended claim.

I claim:

A feed unit for an electrical conduit system formed of units each having male and female end formations affording seriatim mechanical and electrical interconnection, said feed unit comprising a hollow housing having an open side, said housing being of thermosetting plastic and having at one end a formation mating with the end formation of the thereto connected unit of the conduit system; a cover for the open side of said housing, the opposite end of said housing and of the concerned end of said cover having a polylygonal formation enlarged as compared with its said other end formation, said enlarged end formation being provided with a plurality of openings arranged to receive the threaded metal coupling serving to retain an electrical cable, each opening at its sides being respectively slotted to provide a complementary polygonally configurated slot; a threaded nut loosely disposed in said polygonally configurated slot and having an outer polygonal configuration conforming to but less than said polygonally configurated slot, the threading of said nut mating with the threading of the threaded coupling of the electrical cable, said plurality of openings affording selective connection with a cable; conductors fixed within said feed section having binding posts thereon for fixing thereto the conductors of said cable and having sockets thereon for contact with the conductors of the thereto connected unit of the conductor system; and plugs having threading mating with the threading of said nuts for closing the unused of said openings.

JOSEPH F. O'BRIEN.

REFERENCES CITED

The following references are of record in the file of this patent:

UNITED STATES PATENTS

| Number | Name | Date |
|---|---|---|
| 481,914 | Noll | Aug. 30, 1892 |
| 502,083 | McEvoy | July 25, 1893 |
| 2,016,284 | Knight | Oct. 8, 1935 |
| 2,079,800 | Grant | May 11, 1937 |
| 2,114,273 | Huppert | Apr. 12, 1938 |
| 2,281,515 | Ruggieri | Apr. 28, 1942 |
| 2,306,596 | Despard | Dec. 29, 1942 |
| 2,411,018 | Benander | Nov. 12, 1946 |

FOREIGN PATENTS

| Number | Country | Date |
|---|---|---|
| 475,946 | Great Britain | Nov. 29, 1937 |